J. R. QUAIN.
ELECTRIC RESISTANCE ELEMENT.
APPLICATION FILED JULY 11, 1914.
1,146,518.
Patented July 13, 1915.
2 SHEETS—SHEET 1.
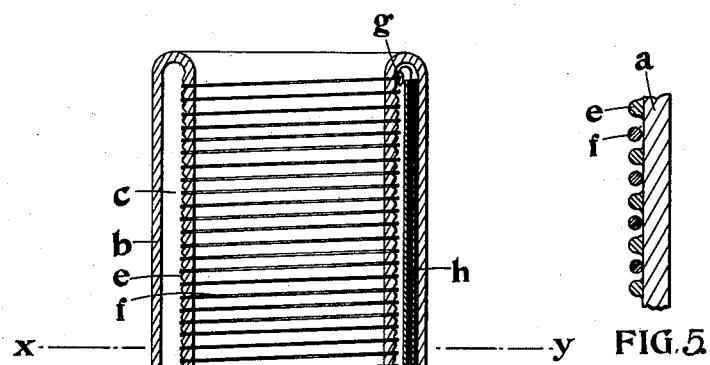
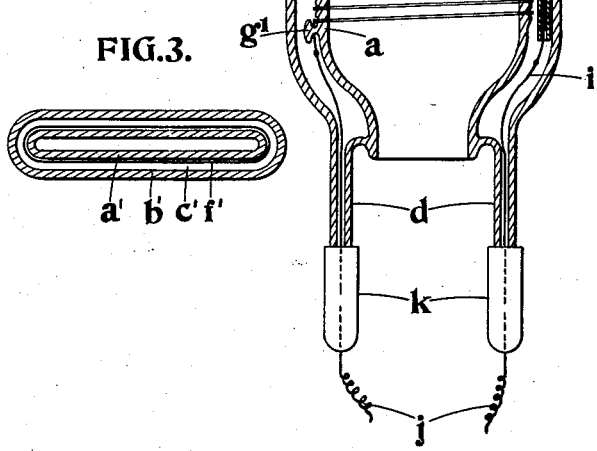
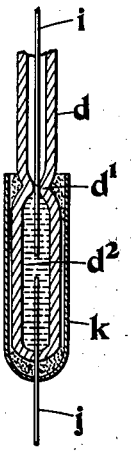
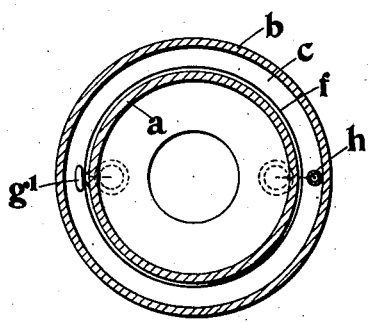
Witnesses—
Stanley Wood
Robert Owen Hughes
Inventor
John Robert Quain
by
Attorney.

J. R. QUAIN.
ELECTRIC RESISTANCE ELEMENT.
APPLICATION FILED JULY 11, 1914.

1,146,518.

Patented July 13, 1915.
2 SHEETS—SHEET 2.

Witnesses—

Inventor
John Robert Quain
by
Attorney.

UNITED STATES PATENT OFFICE.

JOHN ROBERT QUAIN, OF LONDON, ENGLAND.

ELECTRIC-RESISTANCE ELEMENT.

1,146,518.   Specification of Letters Patent.   Patented July 13, 1915.

Application filed July 11, 1914. Serial No. 850,470.

*To all whom it may concern:*

Be it known that I, JOHN ROBERT QUAIN, a subject of the King of Great Britain and Ireland, residing at 17 Victoria street, London, S. W., England, have invented certain new and useful Improvements Relating to Electric-Resistance Elements, of which the following is a specification.

This invention relates to electric resistance elements, and has for its object to provide such elements with the resistance supported and completely inclosed within a casing made wholly of silica, so that thus the necessity of providing a separate inclosing globe or bulb for the filament and its support is avoided, and an element produced, which by reason of its being made wholly of silica is adapted to sudden changes of temperature without destruction. According to the invention such a resistance element is produced by mounting the resistance upon a support of silica, so as to be in contact with the support, and then inclosing this support with the resistance upon it, within a casing or cover, the edges of which are integrally connected by fusion with the ends or the edges of the support so as thus to form a completely inclosed space within which the resistance lies and in which a vacuum or inert gas is provided. Such an element may take any convenient form being capable of general use as, for example, for heating liquids, the element being mounted, for example, either on the cover of a saucepan, kettle, or other utensil, within the vessel, or of being mounted within a casing or frame to form a heater or radiator.

The invention comprises the heater as hereinafter described with reference to the accompanying drawings, in which—

Figure 6:
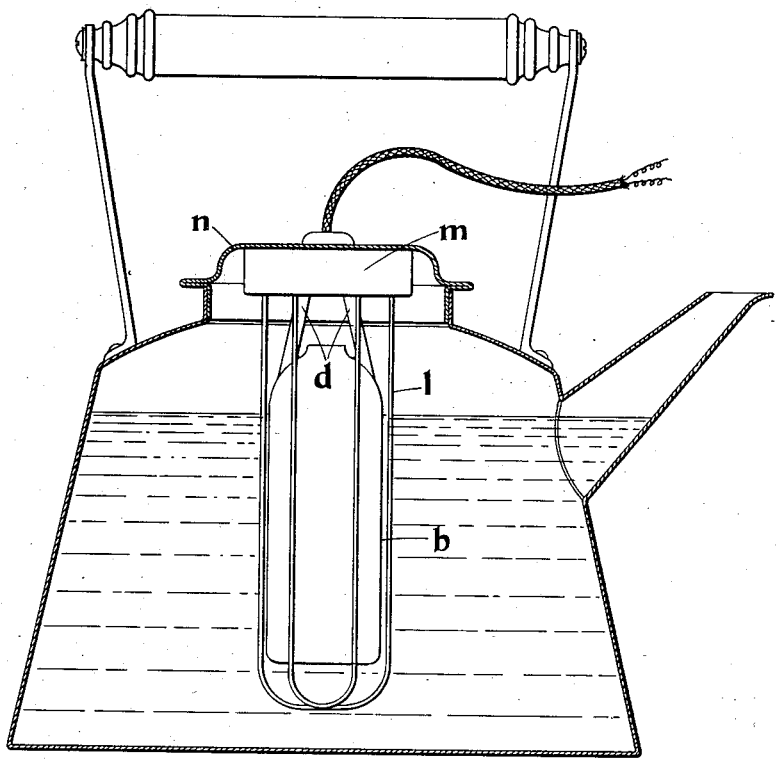
Figure 7:
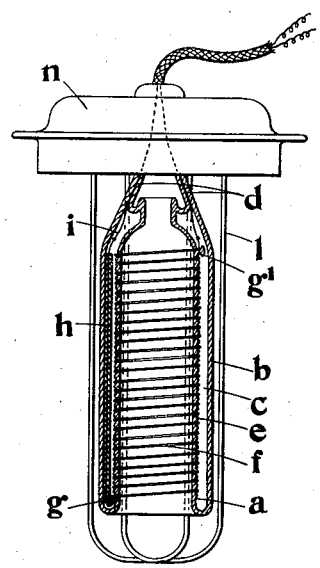

Figure 1 is a sectional elevation of a resistance element provided according to the invention adapted as a heater. Fig. 2 is a sectional plan on the line $x$—$y$ of Fig. 1; Fig. 3 is a sectional elevation illustrating a modification in which an oblong tubular sectional form of the element is employed; Fig. 4 is a detail sectional elevation on an enlarged scale of one of the tubular parts of the element through which the conductor passes and containing a mercury seal; Fig. 5 is a detail view on an enlarged scale showing the manner in which a thread of fused silica may be mounted upon the filament support to maintain the convolutions of the filament apart. Fig. 6 is a sectional elevation of a kettle showing the application of a resistance element for the purpose of heating water, while Fig. 7 is a partial sectional elevation of the element illustrated in Fig. 6.

In carrying the invention into effect as illustrated in Figs. 1 and 2 of the accompanying drawings I provide a tubular support $a$ made of silica, and I mount thereon a resistance $f$ advantageously a metallic filament such as tungsten, molybdenum or nickel chrome in contact with the support, and I inclose the filament within a silica casing $b$ of corresponding shape to that of the support $a$, and integral with it, so as to form an annular space $c$ between them, in which a vacuum is maintained, or within which an inert gas such as hydrogen or nitrogen is inclosed. For this purpose the ends or edges of the support $a$ are fused to the edges or ends of the casing $b$, and in the element illustrated in Fig. 1 the lower part is constricted, and small tubes $d$ of silica are fused to the casing $b$, to carry the conductors by which electric current may pass through the filament. In manufacture a thread $e$ of fused silica is advantageously wound helically upon the support $a$ as indicated in Fig. 5, so as to leave a helical space between the closely wound convolutions of the filament within which the filament may lie. One end of the filament $f$ is advantageously secured or wound upon a button of silica $g$ fused in position at one end of the support, and in order to avoid short circuiting the molybdenum or other conductor $i$ is welded or otherwise secured to the filament and is passed through a small tube of silica $h$, which may be carried loosely by the end which passes through it. The other end of the filament $f$ after being secured or wound upon the button $g^1$ fused in position at the opposite end of the support is welded or otherwise connected to the other conductor $i$ of molybdenum or other suitable metal, and the ends of the respective conductors $i$ pass through the integral tubes $d$, $d$. The tubes $d\ d$ are caused to nip the wires $i$ at $d^1$ (Fig. 4) so as to form an inclosed chamber $d^2$ at the end of the respective tubes to contain a quantity of mercury or lead, the current being led in by means of the wires $j$ of metal such as molybdenum which protrude into the chamber $d^2$, so that thus an effective seal is provided to maintain the vacuum or inert gas within the space $c$, while permitting of the varying degrees of expansion of the respective substances in contact. Caps k k of copper or other suitable metal or material may be fitted over the ends of the tubes d within plaster, and these caps may be mounted within corresponding sockets in such manner as to be readily withdrawn or they may be permanently mounted within suitable fittings. Such an element may advantageously be fitted as a heater to the lid n of a kettle or to any other utensil, as illustrated in Figs. 6 and 7, and the lid may also serve to carry a cage l, m for the protection of the silica casing, or again, a number of such elements may be mounted within one fitting with a common protecting cage or cover. Elements so provided for the purpose of heating may be removable in the fitting, lid, base piece or vessel upon which they are mounted. Furthermore, it will be understood that the support a may be of any suitable form, as for example, it may be of oblong tubular shape in section as illustrated in Fig. 3, in which the support is indicated $a^1$, the inclosing casing $b^1$, the intermediate space $c^1$ and the filament $f^1$.

Any suitable metal may be used for resistance but I prefer to use a metal of a relatively low melting point such as nickel chrome. Further instead of separating the closely wound convolutions of the filament or resistance by means of a thread of silica as illustrated in Fig. 6, I may oxidize the surface of the filament so that thus the filament may be wound closely without the possibility of short circuiting by reason of the resistance afforded by the oxidized surface.

What I do claim as my invention and desire to secure by Letters Patent is:—

An electric resistance heating element, consisting of a closely wound resistance, a hollow support of silica, upon which said resistance is wound, a cover or casing for the said support also of silica, said combined support and casing being integral and jointless and forming a completely inclosed annular space within which said resistance lies free of air, closed tubes also made of silica and integral with said integral support and casing, and conductors passing through the said tubes, through which conductors current passes to the said resistance.

In testimony whereof I have hereunto signed my name to this specification in the presence of two subscribing witnesses.

JOHN ROBERT QUAIN.

Witnesses:
O. J. WORTH,
ROBERT OWEN HUGHES.